(12) United States Patent
Tokunaga

(10) Patent No.: US 12,379,031 B2
(45) Date of Patent: Aug. 5, 2025

(54) SLIDING MEMBER

(71) Applicant: EAGLE INDUSTRY CO., LTD., Tokyo (JP)

(72) Inventor: Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/750,853

(22) Filed: Jun. 21, 2024

(65) Prior Publication Data
US 2024/0344612 A1    Oct. 17, 2024

Related U.S. Application Data

(62) Division of application No. 17/275,505, filed as application No. PCT/JP2019/038155 on Sep. 27, 2019.

(30) Foreign Application Priority Data

Oct. 1, 2018   (JP) .................................. 2018-187003

(51) Int. Cl.
*F16J 15/34*   (2006.01)
*F16C 17/04*   (2006.01)

(52) U.S. Cl.
CPC ......... *F16J 15/3424* (2013.01); *F16C 17/045* (2013.01); *F16C 17/047* (2013.01)

(58) Field of Classification Search
CPC ........................... F16J 15/3412; F16J 15/3256
See application file for complete search history.

(56) References Cited

U.S. PATENT DOCUMENTS

| | | | |
|---|---|---|---|
| 3,085,808 A | 4/1963 | Williams | 277/388 |
| 3,232,680 A | 2/1966 | Clark | 384/110 |
| 3,410,565 A | 11/1968 | Williams | 277/348 |
| 3,466,052 A | 9/1969 | Ludwig | |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,675,935 A | 7/1972 | Ludwig | F16J 15/342 |
| 3,782,737 A | 1/1974 | Ludwig | |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |

(Continued)

FOREIGN PATENT DOCUMENTS

| | | | |
|---|---|---|---|
| CN | 1364987 | 8/2002 | ............... F16J 15/40 |
| CN | 2534429 | 2/2003 | ............... F16J 15/40 |

(Continued)

OTHER PUBLICATIONS

Definition of groove by Merriam Webster.

*Primary Examiner* — Vishal A Patel
(74) *Attorney, Agent, or Firm* — HAYES SOLOWAY P.C.

(57) ABSTRACT

A pair of sliding members sliding relative to each other at sliding faces is configured such that at least one of the sliding faces includes a negative pressure generation mechanism separated from a leakage side by a leakage-side land portion and a land portion arranged in the negative pressure generation mechanism. In the compact sliding members, sliding torque can be reduced and a sealing function can be maintained.

17 Claims, 9 Drawing Sheets

(56) References Cited

U.S. PATENT DOCUMENTS

| | | | |
|---|---|---|---|
| 4,486,026 A | 12/1984 | Furumura et al. | 277/80 |
| 4,523,764 A | 6/1985 | Albers | F16J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,561,520 B2 * | 5/2003 | Kalsi | F16J 15/3244 |
| | | | 277/549 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. | F16J 15/34 |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,611,938 B1 | 4/2017 | Itadani | F16J 15/3416 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/342 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/342 |
| 11,530,749 B2 | 12/2022 | Kimura | F16J 15/441 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2003/0189294 A1 | 10/2003 | Tejima | F16J 15/34 |
| 2004/0080112 A1 | 4/2004 | Tejima | 277/306 |
| 2005/0135714 A1 | 6/2005 | Rahman et al. | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han et al. | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0209011 A1 | 8/2013 | Tokunaga | F16C 32/0633 |
| 2014/0203517 A1 | 7/2014 | Ferris | F16K 15/3412 |
| 2015/0097341 A1 * | 4/2015 | Inoue | F16J 15/3424 |
| | | | 277/400 |
| 2015/0115537 A1 | 4/2015 | Tokunaga | F16J 15/34 |
| 2015/0115540 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 * | 9/2015 | Inoue | F16J 15/3412 |
| | | | 277/400 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 | 1/2016 | Takahashi | F16J 15/3408 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1 | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1 | 8/2017 | Itadani | F16J 15/40 |
| 2018/0038411 A1 * | 2/2018 | Inoue | F16J 15/3412 |
| 2018/0051809 A1 | 2/2018 | Yoshida | F16H 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0135699 A1 | 5/2018 | Takunaga | F16J 15/348 |
| 2018/0195618 A1 | 7/2018 | Itadani | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0145992 A1 | 5/2022 | Miyazaki | F16C 33/107 |
| 2022/0275828 A1 | 9/2022 | Inoue | F16J 15/3424 |
| 2023/0258184 A1 | 8/2023 | Suzuki | F04C 29/00 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 3619489 | 12/1987 | F16J 15/34 |

(56) References Cited

FOREIGN PATENT DOCUMENTS

| | | | |
|---|---|---|---|
| DE | 4407453 | 9/1995 | ............. F16C 17/08 |
| EP | 0637706 | 8/1993 | ............. F16J 15/34 |
| EP | 0896163 | 2/1999 | ............. F16C 33/10 |
| EP | 2520835 | 11/2012 | ............. F16J 15/34 |
| EP | 2626604 | 8/2013 | ............. F16J 15/34 |
| EP | 2977655 | 1/2016 | ............. F16J 15/34 |
| EP | 3091258 | 11/2016 | ............. F16J 15/34 |
| EP | 3299686 | 3/2018 | ............. F16J 15/34 |
| EP | 3514414 | 7/2019 | ............. F16J 15/34 |
| EP | 3922872 | 12/2021 | ............. F16J 15/34 |
| EP | 3926187 | 12/2021 | ............. F16C 17/04 |
| EP | 3926188 | 12/2021 | ............. F16C 17/04 |
| EP | 3943765 | 1/2022 | ............. F16C 17/04 |
| GB | 1509482 | 5/1978 | ............. F16C 33/10 |
| JP | 36-6305 | 5/1961 | |
| JP | S49-33614 | 9/1974 | ............. F16J 15/34 |
| JP | S54-77305 | 6/1979 | ............. B06B 9/10 |
| JP | S55-177549 | 12/1980 | ............. F16J 15/16 |
| JP | S57-146955 | 9/1982 | ............. F16J 15/34 |
| JP | 58-109771 | 6/1983 | ............. F16J 15/34 |
| JP | 58-137667 | 8/1983 | ............. F16J 15/40 |
| JP | S59-58252 | 4/1984 | ............. F16J 15/34 |
| JP | S60-107461 | 7/1985 | ............. B63H 23/36 |
| JP | S6182177 | 5/1986 | ............. F16J 15/34 |
| JP | S62-37572 | 2/1987 | ............. F16J 51/34 |
| JP | S63-033027 | 3/1988 | ............. F16C 33/46 |
| JP | S63-190975 | 8/1988 | ............. F16J 15/34 |
| JP | H01133572 | 9/1989 | ............. F16J 15/34 |
| JP | 2-236067 | 9/1990 | ............. F16J 15/34 |
| JP | 3-14371 | 2/1991 | ............. F16J 15/34 |
| JP | 3-35372 | 4/1991 | ............. F16J 15/34 |
| JP | 3-41267 | 4/1991 | ............. F16J 15/34 |
| JP | 3-41268 | 4/1991 | ............. F16J 15/34 |
| JP | H04-73 | 1/1992 | ............. F16J 15/34 |
| JP | H04-145267 | 5/1992 | ............. F16J 15/34 |
| JP | H04-96671 | 8/1992 | ............. F16J 15/34 |
| JP | H05-90048 | 12/1993 | ............. F16J 15/34 |
| JP | H05-322050 | 12/1993 | ............. F16J 15/34 |
| JP | H07-55016 | 3/1995 | ............. F16J 15/34 |
| JP | H08-89489 | 4/1996 | ............. A61B 5/05 |
| JP | H09-503276 | 3/1997 | ............. F16J 15/34 |
| JP | H09-329247 | 12/1997 | ............. F16J 15/34 |
| JP | H10-38093 | 2/1998 | ............. F16J 15/34 |
| JP | H10-281299 | 10/1998 | ............. F16J 15/34 |
| JP | 2000-179543 | 6/2000 | ............. F16C 17/10 |
| JP | 2001-295833 | 10/2001 | ............. F16C 17/04 |
| JP | 2001-317638 | 11/2001 | ............. F16J 15/34 |
| JP | 2003-161322 | 6/2003 | ............. F16C 33/10 |
| JP | 2003-343741 | 12/2003 | ............. F16J 15/34 |
| JP | 2004-003578 | 1/2004 | ............. F16J 15/34 |
| JP | 2005-188651 | 7/2005 | ............. F16J 15/34 |
| JP | 2005-58051 | 12/2005 | ............. F16C 33/74 |
| JP | 2006-9828 | 1/2006 | ............. F16C 17/02 |
| JP | 2006-022834 | 1/2006 | ............. F16J 15/34 |
| JP | 2006-77899 | 3/2006 | ............. F16J 15/34 |
| JP | 2008-144864 | 6/2008 | ............. F16C 33/10 |
| JP | 2009-250378 | 10/2009 | ............. F16J 15/34 |
| JP | 2010-133496 | 6/2010 | ............. F16J 15/34 |
| JP | 2010-216587 | 9/2010 | ............. F16J 15/34 |
| JP | 2011-185292 | 9/2011 | ............. F16J 15/34 |
| JP | 2011-196429 | 10/2011 | ............. F16J 15/34 |
| JP | 2012-2295 | 1/2012 | ............. F16J 15/34 |
| JP | 5271858 | 5/2013 | ............. F16J 15/34 |
| JP | 2016-80090 | 5/2016 | ............. F16J 15/34 |
| JP | 2017-141961 | 8/2017 | ............. F16J 15/34 |
| JP | 6444492 | 12/2018 | ............. F16J 15/34 |
| JP | 2019-13446 | 1/2019 | ............. A47J 27/00 |
| JP | 2019-15401 | 1/2019 | ............. F16J 15/34 |
| WO | WO9506832 | 3/1995 | ............. F16J 15/34 |
| WO | WO2012046749 | 4/2012 | ............. F16J 15/34 |
| WO | WO2014024742 | 2/2014 | ............. F16J 15/34 |
| WO | WO2014042045 | 3/2014 | ............. F16J 15/34 |
| WO | WO2014050920 | 4/2014 | ............. F16J 15/34 |
| WO | WO2014103630 | 7/2014 | ............. F16J 15/34 |
| WO | WO2014103631 | 7/2014 | ............. F16J 15/34 |
| WO | WO2014112455 | 7/2014 | ............. F16J 15/34 |
| WO | WO2014148316 | 9/2014 | ............. F16J 15/34 |
| WO | WO2014174725 | 10/2014 | ............. F16J 15/34 |
| WO | WO2016009408 | 1/2016 | ............. F16J 15/34 |
| WO | WO2016035860 | 3/2016 | ............. F16J 15/34 |
| WO | WO2016167262 | 10/2016 | ............. F16J 15/34 |
| WO | WO2016186019 | 11/2016 | ............. F16J 15/34 |
| WO | WO2016203878 | 12/2016 | ............. F16J 15/34 |
| WO | WO2017002774 | 1/2017 | ............. F16J 15/34 |
| WO | WO2018034197 | 2/2018 | ............. F16J 15/34 |
| WO | WO2018105505 | 6/2018 | ............. F16J 15/34 |
| WO | WO2018139231 | 8/2018 | ............. F16J 15/34 |
| WO | WO2018139232 | 8/2018 | ............. F16C 33/10 |

\* cited by examiner

SLIDING MEMBER

CROSS REFERENCE TO RELATED APPLICATION

The present application is a divisional of U.S. patent application Ser. No. 17/275,505, filed Mar. 11, 2021, the contents of which are incorporated herein by reference.

TECHNICAL FIELD

The present invention relates to a sliding member suitable for a mechanical seal, a bearing, and other sliding portions, for example. Specifically, the present invention relates to a sliding member for, e.g., a seal ring or a bearing for which friction on a sliding face needs to be reduced and fluid leakage from the sliding face needs to be prevented.

BACKGROUND ART

For maintaining sealability for a long period of time in a mechanical seal as one example of a sliding member, there is the technique of satisfying both of conflicting conditions of "sealing" and "lubrication." For example, a technique has been known, in which at a pair of sliding members sliding relative to each other, a positive pressure generation groove is provided on a sealed fluid side of one sliding face and a negative pressure generation groove is provided on a leakage side, and each of the positive pressure generation groove and the negative pressure generation groove is communicated with the sealed fluid side and is separated from the leakage side by a seal face (see, e.g., Patent Document 1).

When the sliding members with the above-described configuration slide relative to each other, the sliding faces are pushed out by a positive pressure generated by the positive pressure generation groove provided on the sealed fluid side, and a fluid lubrication state in which a liquid film is interposed between the sliding faces is brought. Thus, sliding torque can be reduced. Moreover, pumping action for sucking fluid into a portion between the sliding faces from the leakage side is caused utilizing a negative pressure generated by the negative pressure generation groove provided on the leakage side, and therefore, a leakage amount can be extremely small.

CITATION LIST

Patent Documents

Patent Document 1: WO 2012/046749

SUMMARY OF INVENTION

Problem to be Solved by the Invention

However, in the above-described technique, the positive pressure generation groove needs to be provided on the sealed fluid side of the sliding face, and the negative pressure generation groove needs to be provided on the leakage side. This leads to a problem that a sliding face component is increased in size.

The present invention is intended to provide a compact sliding member configured so that sliding torque can be reduced and a sealing function can be maintained.

Means for Solving Problem

In order to solve the above-described problem, a sliding member of a first aspect of the present invention is characterized by a pair of sliding members sliding relative to each other at sliding faces,
at least one of the sliding faces including a negative pressure generation mechanism separated from a leakage side by a leakage-side land portion and a land portion arranged in the negative pressure generation mechanism.

According to the first aspect, cavitation occurs due to pressure reduction in the negative pressure generation mechanism, and liquid is evaporated inside the cavitation and the cavitation is filled with gas with a small viscosity. Thus, sliding torque of the sliding member can be reduced. Moreover, a positive pressure is generated by a wedge effect of the land portion arranged in the negative pressure generation mechanism, and therefore, the sliding faces can be pushed out and fluid can be interposed between the sliding faces. Thus, the sliding torque can be further reduced. In addition, fluid is sucked into a portion between the sliding faces from the leakage side by means of a negative pressure generated by the negative pressure generation mechanism, and therefore, a leakage amount can be extremely small. Sliding torque reduction and sealability improvement as conflicting performances can be accomplished by the single negative pressure generation mechanism without the need for separately providing a positive pressure generation mechanism and a negative pressure generation mechanism as in a typical technique, and therefore, the sliding member can be compactified.

The sliding member according to a second aspect of the present invention is characterized in that the land portion arranged in the negative pressure generation mechanism is surrounded by the negative pressure generation mechanism and is formed in an island shape.

According to the second aspect, the vicinity of the island-shaped land portion serves as a positive pressure region to exert a fluid lubrication function to reduce the sliding torque, and a portion apart from the island-shaped land portion serves as a gas phase region as a cavitation region to accomplish sliding torque reduction and sealability improvement by pumping action. Thus, sliding torque reduction and sealability improvement as the conflicting performances can be accomplished by the single negative pressure generation mechanism without the need for separately providing a positive pressure generation mechanism and a negative pressure generation mechanism.

The sliding member according to a third aspect of the present invention is characterized in that
the island-shaped land portion further includes a bridge portion extending to a sealed-fluid-side land portion.

According to the third aspect, the island-shaped land portion arranged in the negative pressure generation mechanism and the bridge portion extending to the sealed-fluid-side land portion efficiently hold back gas in the negative pressure generation mechanism to generate the positive pressure, and therefore, the gas can be interposed between the sliding faces and the sliding torque can be further reduced.

The sliding member according to a fourth aspect of the present invention is characterized in that
the negative pressure generation mechanism includes a guide groove extending from a leakage side toward the land portion arranged in the negative pressure generation mechanism.

According to the fourth aspect, fluid in the negative pressure generation mechanism is efficiently guided from the leakage side to the land portion arranged in the negative pressure generation mechanism by the guide groove, and is held back by the land portion to generate the positive pressure. Thus, the sliding torque can be reduced.

The sliding member according to a fifth aspect of the present invention is characterized in that the negative pressure generation mechanism includes a guide groove extending from each of the leakage side and a sealed fluid side toward the land portion arranged in the negative pressure generation mechanism.

According to the fifth aspect, fluid in the negative pressure generation mechanism is efficiently guided from the leakage side and the sealed fluid side to the land portion arranged in the negative pressure generation mechanism by the guide groove, and is held back by the land portion to generate the positive pressure. Thus, the sliding torque can be reduced.

The sliding member according to a sixth aspect of the present invention is characterized in that the negative pressure generation mechanism includes a portion remaining after the land portion has been removed from the sliding face.

According to the sixth aspect, the negative pressure generation mechanism includes the portion remaining after the land portion has been removed from the sliding face. Thus, the area of the negative pressure generation mechanism can be large, and therefore, the area of contact between gas with a small viscosity and the sliding face can be large. Consequently, the sliding torque can be reduced.

The sliding member according to a seventh aspect of the present invention is characterized in that the negative pressure generation mechanism is arranged across the average diameter of the sliding face.

According to the seventh aspect, the negative pressure generation mechanism is arranged across both sides of the average diameter of the sliding face. Thus, the area of the negative pressure generation mechanism can be large, and therefore, the area of contact between gas with a small viscosity and the sliding face can be large. Consequently, the sliding torque can be reduced.

The sliding member according to an eighth aspect of the present invention is characterized in that the negative pressure generation mechanism includes a fluid introduction groove communicated with the sealed fluid side and a groove portion having an opening communicated with the fluid introduction groove on a downstream side and a dead end portion surrounded by the land portion on an upstream side.

According to the eighth aspect, the negative pressure generation mechanism can be easily formed.

The sliding member according to a ninth aspect of the present invention is characterized in that the land portion surrounding the dead end portion includes a positive pressure generation mechanism having an opening communicated with the fluid introduction groove.

According to the ninth aspect, even when a fluid lubrication state at, e.g., start-up timing is not sufficiently brought, the positive pressure generation mechanism can generate the positive pressure to maintain the fluid lubrication state.

The sliding member according to a tenth aspect of the present invention is characterized in that the negative pressure generation mechanism includes multiple negative pressure generation mechanisms arranged at the sliding face.

According to the tenth aspect, the negative pressure generation mechanism and the land portion can be optimally arranged according to the size of the sliding face.

The sliding member according to an eleventh aspect of the present invention is characterized in that the land portion arranged in the negative pressure generation mechanism includes multiple land portions arranged in the negative pressure generation mechanism.

According to the eleventh aspect, the land portion can be optimally arranged in the negative pressure generation mechanism according to the size of the sliding face.

DESCRIPTION OF EMBODIMENTS

Hereinafter, modes for carrying out a sliding member according to the present invention will be described based on embodiments.

First Embodiment

Hereinafter, an exemplary mode for carrying out this invention will be described based on an embodiment with reference to the drawings. Note that unless otherwise clearly described, the dimensions, materials, shapes, and relative arrangement of components described in this embodiment are not intended to limit the claims of the present invention.

A sliding member according to a first embodiment of the present invention will be described with reference to FIGS. 1 and 2. Note that in the first embodiment, a mechanical seal as one example of the sliding member will be described. In the first embodiment, an outer peripheral side of the sliding member forming the mechanical seal will be described as a sealed fluid side (a high-pressure fluid side), and an inner peripheral side will be described as a leakage side (a low-pressure fluid side).

Figure 1:
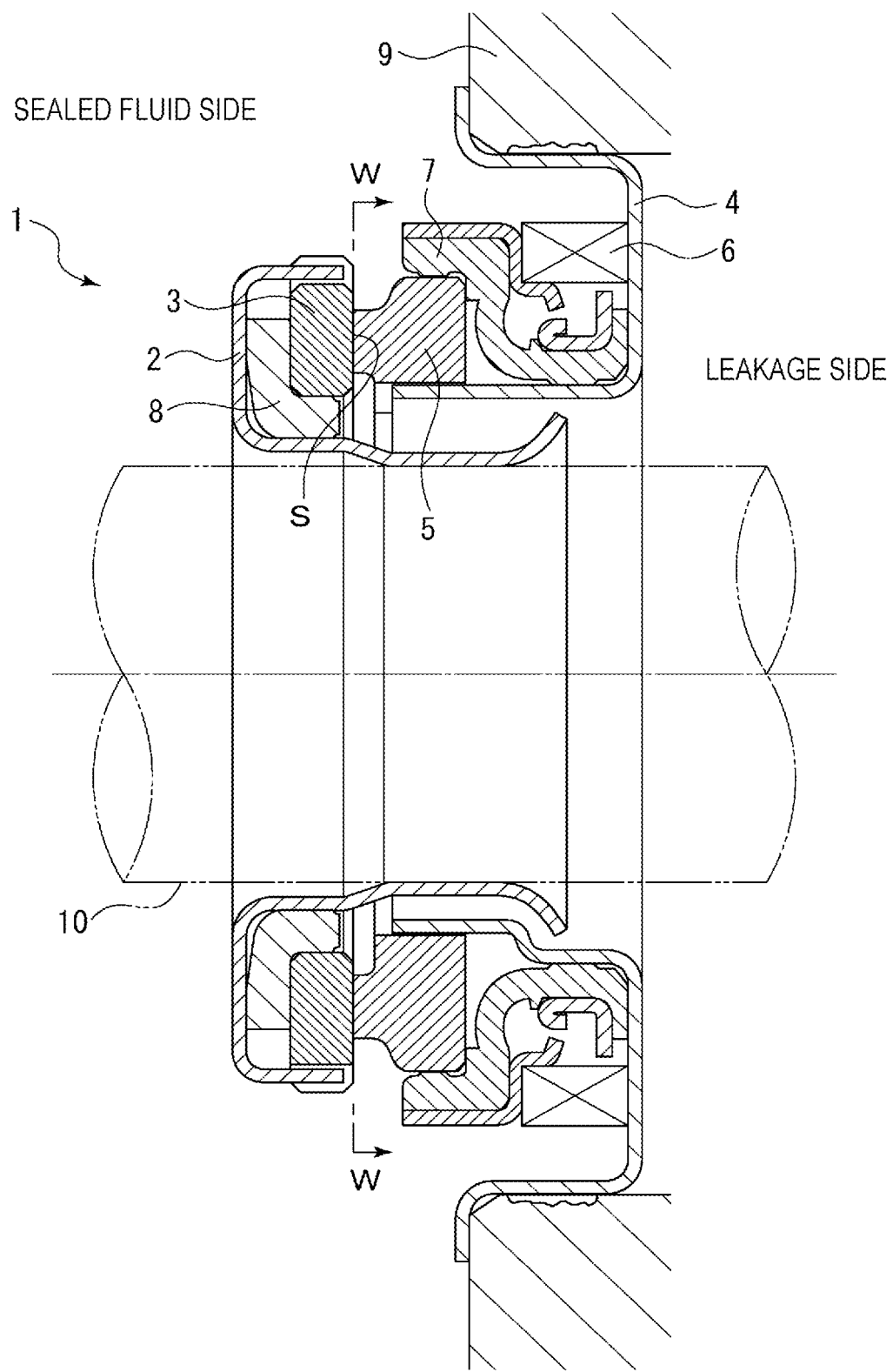
FIG. 1 is a longitudinal sectional view showing one example of a mechanical seal including sliding faces according to the present invention.

FIG. 1 is a longitudinal sectional view showing one example of the mechanical seal 1, and shows an inside mechanical seal configured to seal sealed fluid tending to leak in an inner circumferential direction from the outer periphery of a sliding face and including a rotating-side cartridge and a stationary-side cartridge. The rotating-side cartridge includes a sleeve 2 fitted onto a rotary shaft 10, an annular rotating-side seal ring 3 as one sliding member, and a packing 8 configured to seal a portion between the sleeve 2 and the rotating-side seal ring 3, and rotates together with the rotary shaft 10.

The stationary-side cartridge includes a housing 4 attached to a casing 9, an annular stationary-side seal ring 5 as another sliding member, a bellows 7 configured to seal the stationary-side seal ring 5 and the housing 4, and a coiled wave spring 6 configured to bias the stationary-side seal ring 5 to a rotating-side-seal-ring-3 side through the bellows 7, and is fixed to the casing 9 in a rotation direction and an axial direction.

The mechanical seal 1 having the above-described configuration prevents outflow of the sealed fluid from the outer peripheral side to the inner peripheral side due to sliding of a sliding face S of the rotating-side seal ring 3 and a sliding face S of the stationary-side seal ring 5 on each other. Note that FIG. 1 shows a case where the width of the sliding face S of the rotating-side seal ring 3 is wider than the width of the sliding face S of the stationary-side seal ring 5, but the present invention is not limited to such a case. Needless to say, the present invention is also applicable to an opposite case.

The materials of the rotating-side seal ring 3 and the stationary-side seal ring 5 are selected from, e.g., silicon carbide (SiC) with excellent abrasion resistance and carbon with excellent self-lubricating properties. For example, both of these rings may be made of SiC, or a combination of the SiC rotating-side seal ring 3 and the carbon stationary-side seal ring 5 may be employed.

Figure 2:
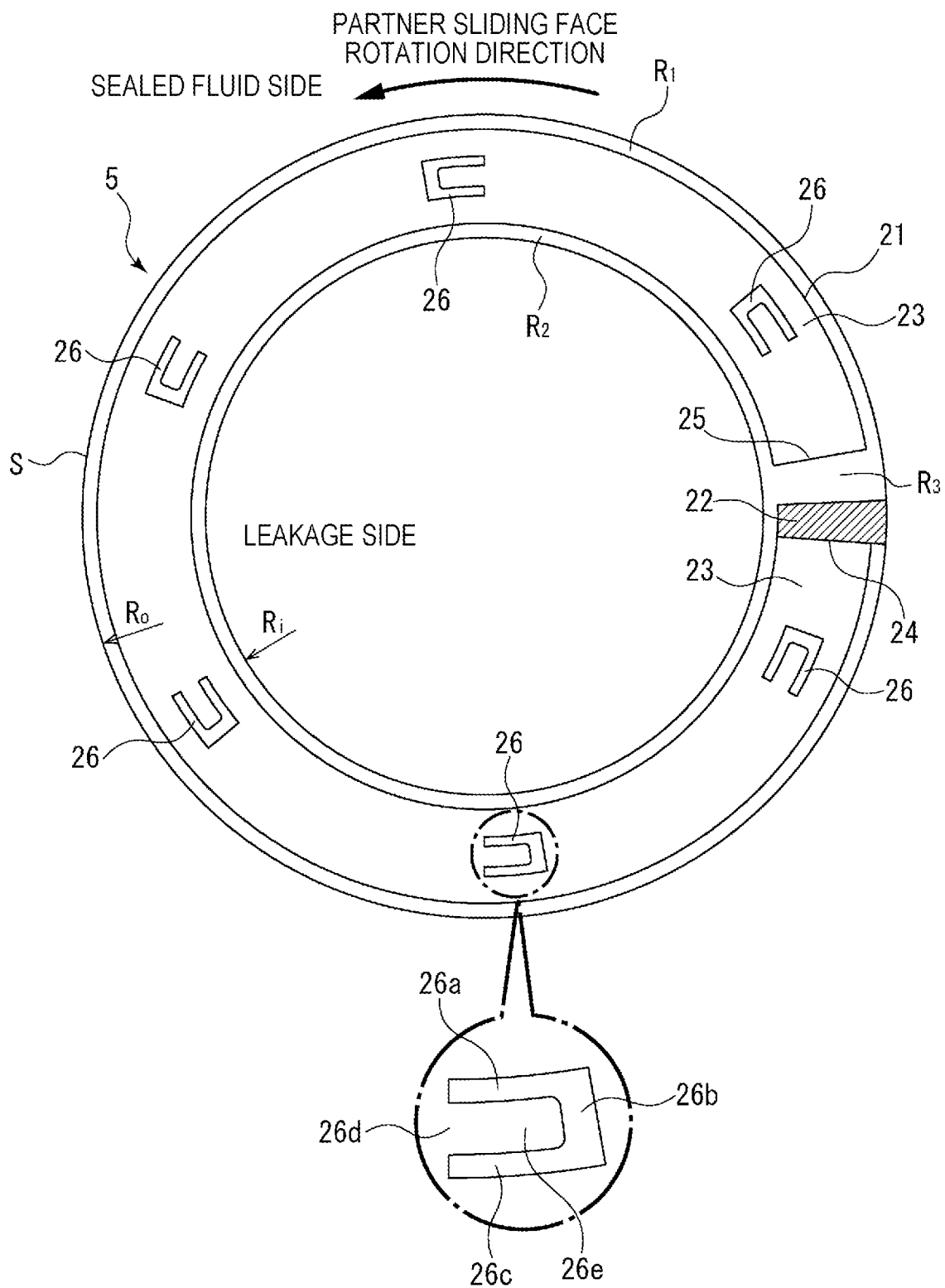
FIG. 2 is a view showing a sliding face of a sliding member of a first embodiment as viewed from a W-W arrow of FIG. 1.

As shown in FIG. 2, the sliding face S of the stationary-side seal ring 5 includes a negative pressure generation mechanism 21. The negative pressure generation mechanism 21 is separated from the leakage side by a leakage-side land portion R2. The negative pressure generation mechanism 21 includes a fluid introduction groove 22 communicated with the sealed fluid side and an annular groove portion 23 having an opening 24 communicated with the fluid introduction groove 22 on a downstream side and a dead end portion 25 surrounded by a radial land portion R3 arranged between a sealed-fluid-side land portion R1 and the leakage-side land portion R2. With this configuration, the negative pressure generation mechanism 21 is separated from the sealed fluid side and the leakage side by the radial land portion R3 at which the upstream-side dead end portion 25 is arranged between the sealed-fluid-side land portion R1 and the leakage-side land portion R2, and the downstream-side opening 24 is communicated with the sealed fluid side. The depth of the groove portion 23 is 1 µm to 50 µm, the fluid introduction groove 22 is 50 µm to 1000 µm, and the fluid introduction groove 22 is formed deeper than the groove portion 23.

The negative pressure generation mechanism 21 is arranged on both sides of the average diameter Rm of the sliding face S of the stationary-side seal ring 5 across the average diameter Rm. In this case, the average diameter Rm is (Ro+Ri)/2 where Ro is the outer diameter of the sliding face S and Ri is the inner diameter of the sliding face S.

As shown in FIG. 2, a predetermined number (six in the embodiment of FIG. 2) of land portions 26 are arranged inside the negative pressure generation mechanism 21. The land portions 26 are surrounded by the groove portion 23, and are formed in an island shape. The land portion 26 has wall portions 26*a*, 26*b*, 26*c* surrounding an internal space 26*e* and an opening 26*d* opening toward an upstream side, and the internal space 26*e* is communicated with the groove portion 23 through the opening 26*d*. A face at which the wall portions 26*a*, 26*b*, 26*c* of the land portions 26 slide on a partner-side sliding face S (the sliding face S of the rotating-side seal ring 3) is smoothly finished with the substantially-same height as those of the sealed-fluid-side land portion R1, the leakage-side land portion R2, and the radial land portion R3 of the negative pressure generation mechanism 21. Note that the outer shape of the land portion 26 is formed as a rectangular shape, but may be formed as a triangular shape or a polygonal shape of a pentagonal shape or more.

The negative pressure generation mechanism 21 includes a portion remaining after the island-shaped land portions 26, the sealed-fluid-side land portion R1, the leakage-side land portion R2, and the radial land portion R3 have been removed from the sliding face S of the stationary-side seal ring 5.

When a partner sliding member (the rotating-side seal ring 3) rotates in a predetermined direction (a counterclockwise direction in FIG. 2), fluid in the groove portion 23 of the negative pressure generation mechanism 21 moves, due to viscosity thereof, to the downstream side to follow a movement direction of the rotating-side seal ring 3, and is discharged to the sealed fluid side through the downstream-side fluid introduction groove 22. Thus, in the negative pressure generation mechanism 21, fluid discharged from the groove portion 23 is greater than fluid supplied into the groove portion 23, and for this reason, the inside of the negative pressure generation mechanism 21 is brought into a negative pressure and cavitation occurs. A cavitation region has a gas phase caused as a result of rupture of a liquid film due to an insufficient liquid flow rate. In the cavitation region, friction using gas with a small viscosity is dominant, and sliding torque can be reduced as compared to typical fluid lubrication with liquid. The negative pressure generation mechanism 21 described herein is arranged with a substantially-equal width on both sides of the average diameter Rm of the sliding face S of the stationary-side seal ring 5 across the average diameter Rm, and therefore, the cavitation region can be formed across a wide area from the leakage side to the sealed fluid side of the sliding face S. With this configuration, the sliding face S slides with the gas with the small viscosity across the wide area, and therefore, the sliding torque can be reduced.

However, when the cavitation region is formed across the wide area of the sliding face S, the sliding face S is entirely under the negative pressure, and the stationary-side seal ring 5 and the rotating-side seal ring 3 stick and contact each other. For this reason, a fluid lubrication state cannot be maintained. For this reason, the land portions 26 are arranged inside the negative pressure generation mechanism 21 so that a positive pressure can be generated by a wedge effect generated by the land portions 26 to push out the sliding faces S and bring the sliding faces S into the fluid lubrication state. Note that the number of land portions 26 is not limited to that in the present embodiment as long as the sliding faces S can be pushed out and brought into the fluid lubrication state, and may be more or less than six.

As described above, the sliding member of the present invention provides the following advantageous effects.
1. In the cavitation region inside the negative pressure generation mechanism 21, sliding with less-friction gas is dominant, and therefore, the sliding torque can be reduced as compared to typical fluid lubrication with liquid.
2. Fluid in the negative pressure generation mechanism 21 generates the positive pressure by the wedge effect by the land portions 26 so that a portion between the sliding faces S can be pushed out and the sliding faces S can be maintained in the fluid lubrication state, and therefore, the sliding torque can be reduced.

3. The inside of the negative pressure generation mechanism 21 is under the negative pressure, and therefore, pumping action for sucking fluid into the portion between the sliding faces S from the leakage side is exerted so that leakage can be suppressed extremely small. Thus, sealability can be further improved.

4. The land portions 26 are arranged inside the negative pressure generation mechanism 21 so that the positive pressure can be generated at the periphery of the land portions 26 to push out the portion between the sliding faces S and bring the sliding faces S into the fluid lubrication state, and therefore, the sliding torque can be reduced. Moreover, in the cavitation region inside the negative pressure generation mechanism 21, sliding with less-friction gas is dominant, and therefore, the sliding torque can be further reduced. Further, the negative pressure generation mechanism 21 exerts the pumping action by means of the negative pressure in the negative pressure generation mechanism 21, and therefore, leakage can be suppressed extremely small. That is, sliding torque reduction and sealability improvement as conflicting performances can be accomplished by the single negative pressure generation mechanism 21 without the need for separately providing a positive pressure generation mechanism and a negative pressure generation mechanism as in a typical technique, and therefore, the sliding member can be compactified.

Second Embodiment

Figure 3:
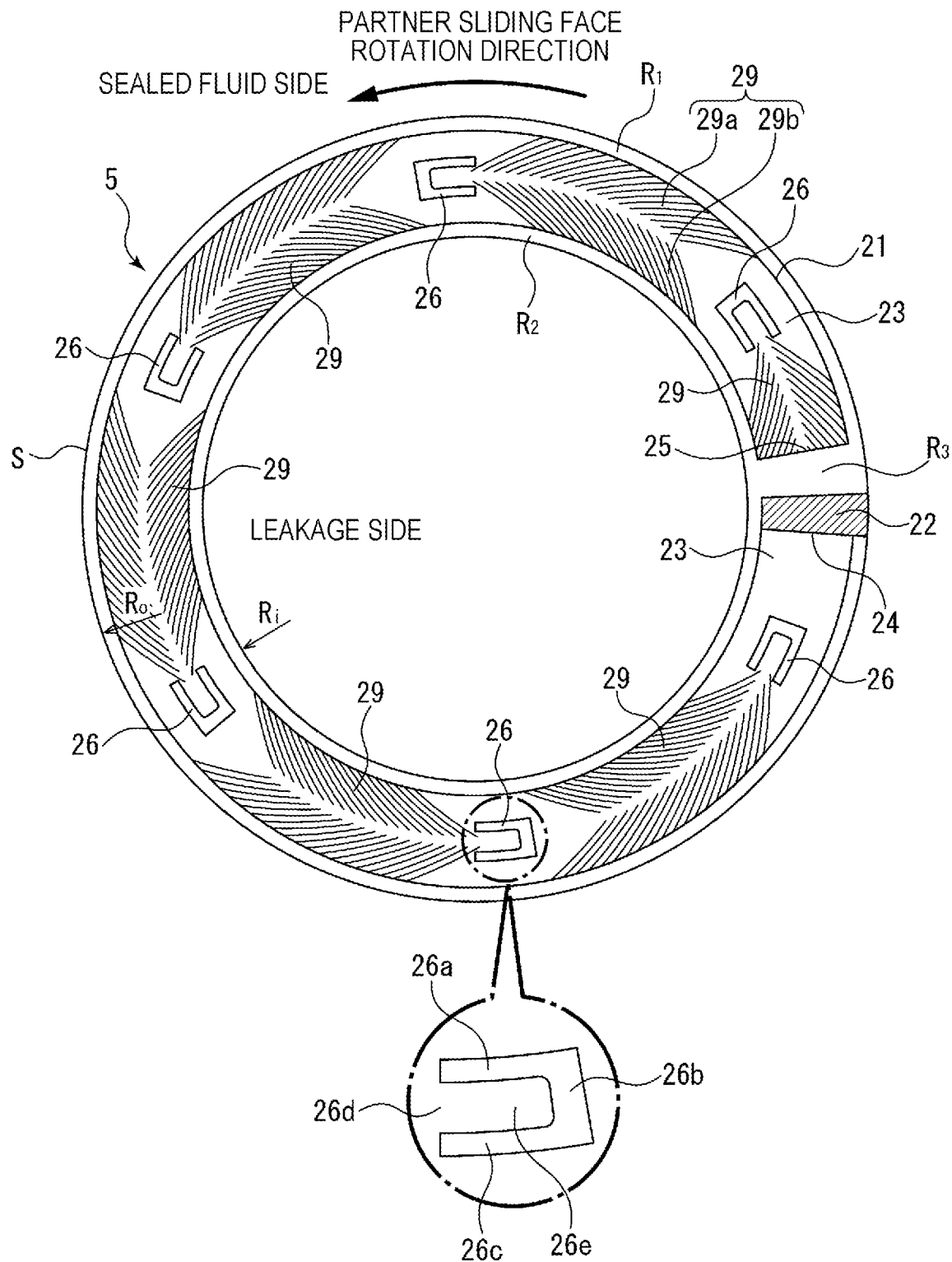
FIG. 3 is a view showing a sliding face of a sliding member of a second embodiment as viewed from the W-W arrow of FIG. 1.

A sliding member according to a second embodiment of the present invention will be described. FIG. 3 shows a sliding face S of the sliding member according to the second embodiment. FIG. 3 is different from the first embodiment in that a guide groove 29 is provided, but is the same as the first embodiment in other configurations. Hereinafter, the same reference numerals are used to represent the same members as those of the first embodiment, and overlapping description will be omitted.

As shown in FIG. 3, a sliding face S of a stationary-side seal ring 5 includes a negative pressure generation mechanism 21. The negative pressure generation mechanism 21 includes a fluid introduction groove 22 communicated with a sealed fluid side and an annular groove portion 23 having an opening 24 communicated with the fluid introduction groove 22 on a downstream side and a dead end portion 25 surrounded by a sealed-fluid-side land portion R1, a leakage-side land portion R2, and a radial land portion R3. With this configuration, in the negative pressure generation mechanism 21, the upstream-side dead end portion 25 is separated from the sealed fluid side and a leakage side by the radial land portion R3 arranged between the sealed-fluid-side land portion R1 and the leakage-side land portion R2, and the downstream-side opening 24 is communicated with the sealed fluid side. The depth of the groove portion 23 is 1 μm to 50 μm, the fluid introduction groove 22 is 50 μm to 1000 μm, and the fluid introduction groove 22 is formed deeper than the groove portion 23.

Figure 4:
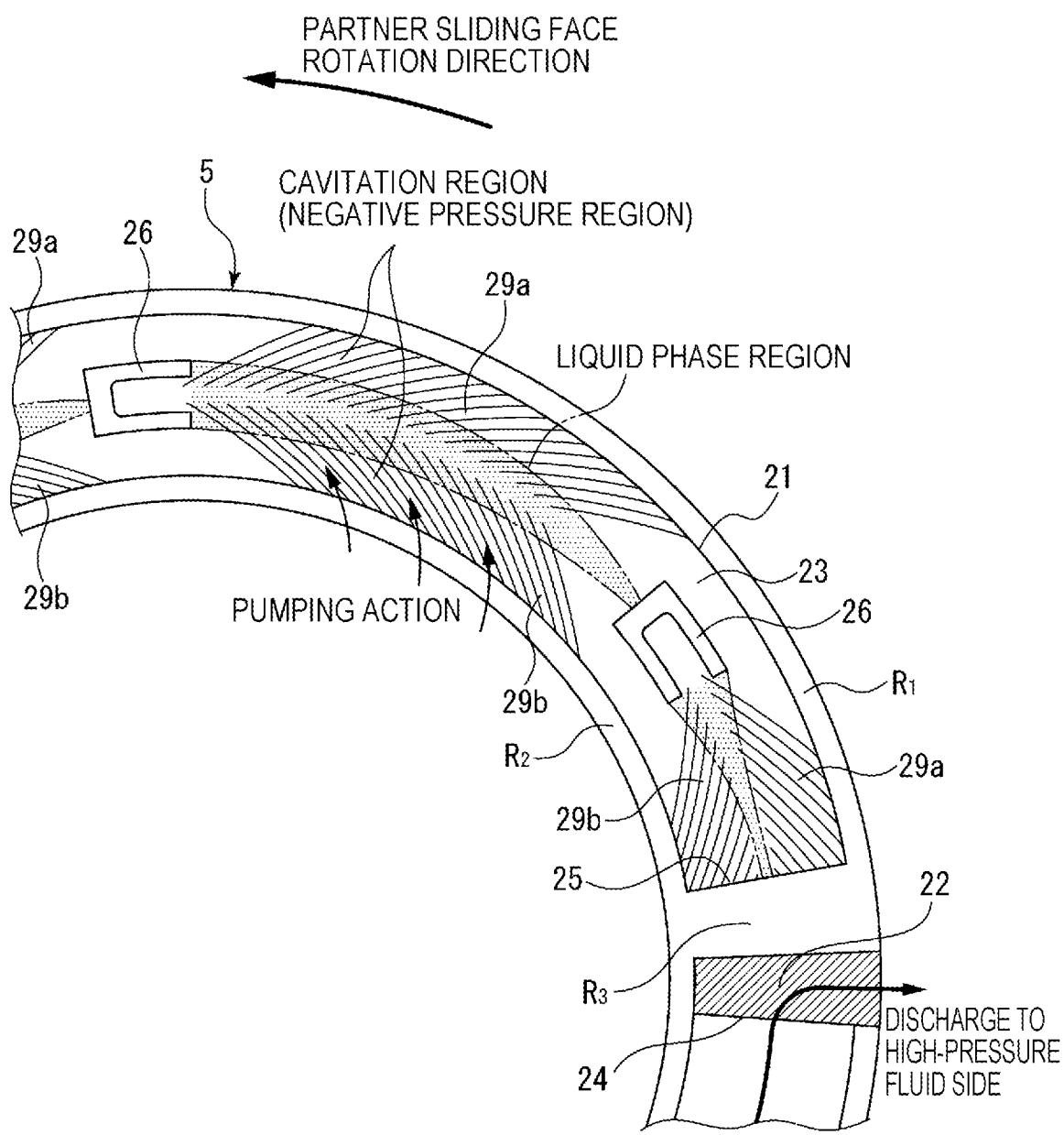
FIG. 4 is a partially-enlarged view of the sliding face of FIG. 3.

As shown in FIGS. 3 and 4, a predetermined number (six in the embodiment of FIG. 3) of island-shaped land portions 26 surrounded by the negative pressure generation mechanism 21 are arranged. The land portion 26 has wall portions 26a, 26b, 26c surrounding an internal space 26e and an opening 26d opening toward an upstream side, and the internal space 26e is communicated with the groove portion 23 through the opening 26d. A face at which the wall portions 26a, 26b, 26c of the land portions 26 slide on a partner-side sliding face S (a sliding face S of a rotating-side seal ring 3) is smoothly finished with the substantially-same height as those of the sealed-fluid-side land portion R1, the leakage-side land portion R2, and the radial land portion R3. Note that the outer shape of the land portion 26 is formed as a rectangular shape, but may be formed as a triangular shape, a polygonal shape of a pentagonal shape or more, a semi-circular shape, a semi-elliptical shape, etc.

The guide groove 29 is provided at a bottom portion of the negative pressure generation mechanism 21. Multiple extremely-thin grooves shallower than the groove portion 23 of the negative pressure generation mechanism 21 are arranged to form the guide groove 29. The guide groove 29 includes sealed-fluid-side guide grooves 29a arranged at substantially-equal intervals in a circumferential direction from the sealed-fluid-side land portion R1 toward a center portion (an average diameter Rm) of the sliding face S and leakage-side guide grooves 29b arranged at substantially-equal intervals in the circumferential direction from the leakage-side land portion R2 toward the center portion (the average diameter Rm) of the sliding face S. The sealed-fluid-side guide groove 29a and the leakage-side guide groove 29b are, as a whole, arranged to extend toward the opening 26d of the land portion 26.

The negative pressure generation mechanism 21 includes a portion remaining after the land portions 26, the sealed-fluid-side land portion R1, the leakage-side land portion R2, and the radial land portion R3 have been removed from the sliding face S of the stationary-side seal ring 5.

As shown in FIGS. 3 and 4, when a partner sliding member (the rotating-side seal ring 3) rotates in a predetermined direction (a counterclockwise direction in FIGS. 3 and 4), fluid in the groove portion 23 of the negative pressure generation mechanism 21 moves, due to viscosity thereof, to the downstream side to follow a movement direction of the rotating-side seal ring 3, and is discharged to the sealed fluid side through the downstreammost-side fluid introduction groove 22. Thus, in the negative pressure generation mechanism 21, fluid discharged from the groove portion 23 is greater than fluid supplied into the groove portion 23, and for this reason, the inside of the negative pressure generation mechanism 21 is brought into a negative pressure and cavitation occurs. A cavitation region is a gas phase region caused as a result of rupture of a liquid film due to an insufficient liquid flow rate. In the cavitation region, friction using gas with a small viscosity is dominant, and sliding torque can be reduced as compared to typical fluid lubrication with liquid. The negative pressure generation mechanism 21 described herein is arranged with a substantially-equal width on both sides of the average diameter Rm of the sliding face S of the stationary-side seal ring 5 across the average diameter Rm, and therefore, the cavitation region can be formed across a wide area from the leakage side to the sealed fluid side of the sliding face S. With this configuration, the sliding face slides with the gas with the small viscosity across the wide area, and therefore, the sliding torque can be reduced.

However, when the cavitation region is formed across the wide area of the sliding face S, the sliding face S is entirely under the negative pressure, and the stationary-side seal ring 5 and the rotating-side seal ring 3 stick and contact each other. For this reason, a fluid lubrication state cannot be maintained. For this reason, the land portions 26 are arranged inside the negative pressure generation mechanism 21 so that a positive pressure can be generated by a wedge effect of the land portions 26 to push out a portion between the sliding faces S and bring the portion between sliding faces S into the fluid lubrication state. Note that the number of land portions 26 is not limited to that in the present embodiment as long as the portion between the sliding faces S can be pushed out and brought into the fluid lubrication state, and may be more or less than six.

The cavitation region is mainly the gas phase region, but a liquid flow is normally present inside the cavitation region. Such liquid is heavier than gas, and is gathered to the bottom portion of the negative pressure generation mechanism 21. For this reason, the guide groove 29 is provided at the bottom portion of the negative pressure generation mechanism 21 so that the liquid in the cavitation region can be efficiently gathered to the land portions 26 arranged inside the negative pressure generation mechanism 21. The liquid gathered to the openings 26d of the land portions 26 generate a high positive pressure by the wedge effect by the land portions 26, and can push out the portion between the sliding faces S to maintain the fluid lubrication state.

As shown in FIG. 4, the liquid in the cavitation region is guided by the sealed-fluid-side guide grooves 29a and the leakage-side guide grooves 29b, and a band-shaped liquid phase region is formed at the center portion of the sliding face S. Further, the liquid phase region is guided to the openings 26d of the land portions 26 by rotation of the rotating-side seal ring 3, and a high positive pressure is generated by the wedge effect by the land portions 26 so that the portion between the sliding faces S can be pushed out and the sliding faces S can be maintained in the fluid lubrication state.

Moreover, the cavitation region is formed on both sides of the liquid phase region, and friction using gas with a small viscosity is dominant. Thus, the sliding torque can be reduced as compared to typical fluid lubrication with liquid. Further, the cavitation region is a negative pressure region, and therefore, the negative pressure generation mechanism 21 can exert pumping action for sucking fluid into the portion between the sliding faces S from the leakage side by means of the negative pressure, thereby reducing leakage.

Note that in the present embodiment, the guide groove 29 includes the sealed-fluid-side guide grooves 29a and the leakage-side guide grooves 29b, but may include the sealed-fluid-side guide grooves 29a or the leakage-side guide grooves 29b.

As described above, the sliding member of the present invention provides the following advantageous effects.
1. The negative pressure generation mechanism 21 generates the negative pressure, and the inside of the negative pressure generation mechanism 21 becomes the cavitation region. Thus, friction using gas is dominant in the negative pressure generation mechanism 21. Consequently, the sliding torque can be reduced as compared to typical fluid lubrication with liquid.
2. Liquid in the cavitation region is heavier than gas, and is gathered to the bottom portion of the negative pressure generation mechanism 21. Thus, the guide groove 29 is provided at the bottom portion of the negative pressure generation mechanism 21 so that liquid remaining in the cavitation region can be efficiently guided to a predetermined position.
3. The liquid, which has been guided to the land portions 26 by the guide groove 29, in the cavitation region generates the positive pressure by the wedge effect by the land portions 26 so that the portion between the sliding faces S can be pushed out and the sliding faces S can be maintained in the fluid lubrication state.
4. The negative pressure generation mechanism 21 becomes the negative pressure region, and therefore, exerts the pumping action for sucking fluid into the portion between the sliding faces S from the leakage side by the negative pressure so that leakage can be reduced and sealability can be further improved.
5. The land portions 26 are arranged inside the negative pressure generation mechanism 21 so that the positive pressure can be generated at the periphery of the land portions 26 to push out the portion between the sliding faces S and bring the portion between the sliding faces S into the fluid lubrication state. Thus, the sliding torque can be reduced. The cavitation region inside the negative pressure generation mechanism 21 becomes the less-friction gas phase region, and therefore, the sliding torque can be further reduced. The negative pressure generation mechanism 21 exerts the pumping action by means of the negative pressure in the negative pressure generation mechanism 21, and therefore, leakage can be suppressed extremely small, and the sealability can be improved. That is, sliding torque reduction and sealability improvement as conflicting performances can be accomplished by the single negative pressure generation mechanism 21 without the need for separately providing a positive pressure generation mechanism and a negative pressure generation mechanism as in a typical technique, and therefore, the sliding member can be compactified.

Third Embodiment

Figure 5:
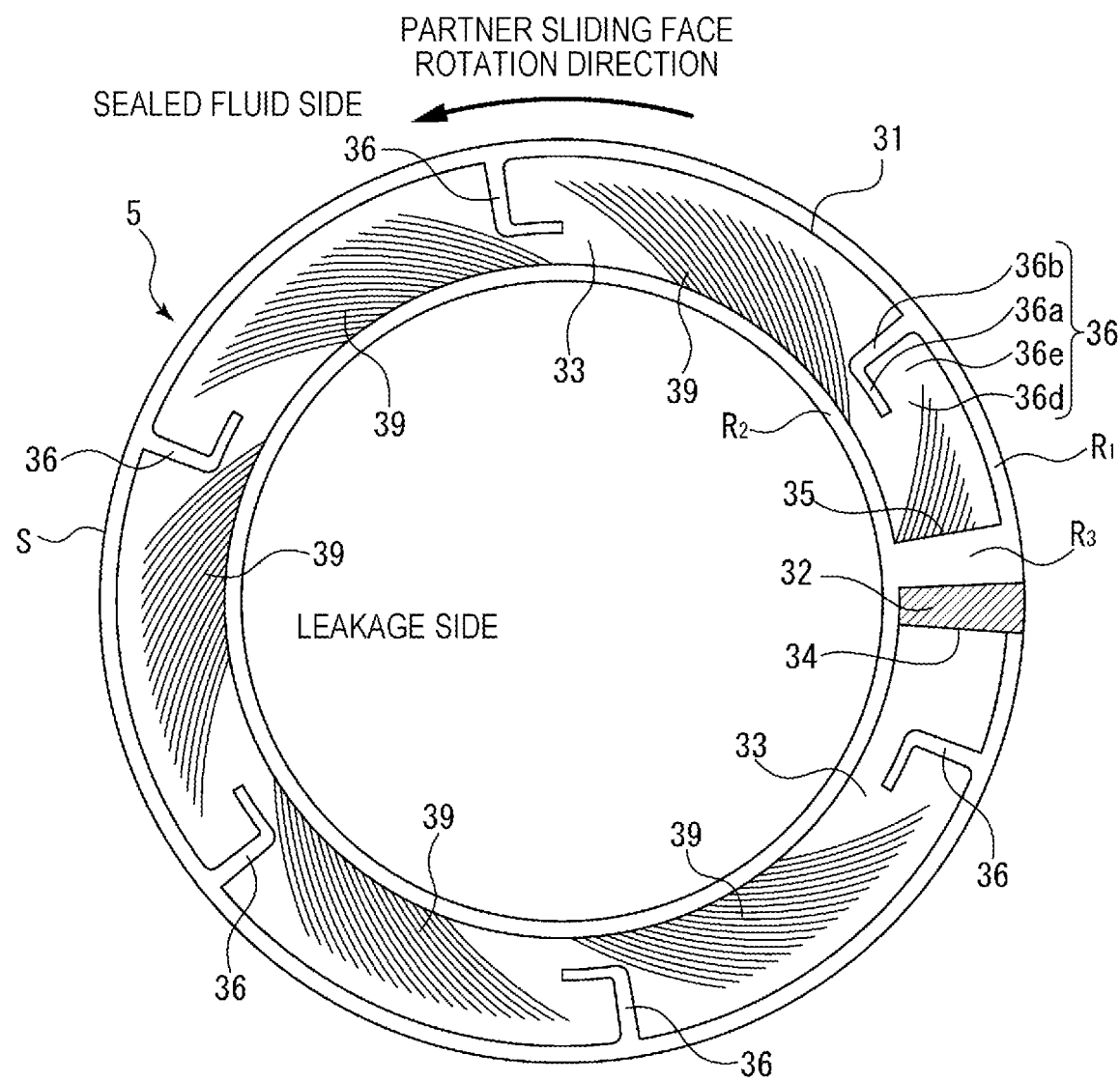
FIG. 5 is a view showing a sliding face of a sliding member of a third embodiment as viewed from the W-W arrow of FIG. 1.

A sliding member according to a third embodiment of the present invention will be described. FIG. 5 shows a sliding face S of the sliding member according to the third embodiment. FIG. 5 is only different from the second embodiment in the shape of a land portion 36 and the configuration of a guide groove 39, and is the same as the second embodiment in other configurations. Hereinafter, the same reference numerals are used to represent the same members as those of the second embodiment, and overlapping description will be omitted.

As shown in FIG. 5, a sliding face S of a stationary-side seal ring 5 includes a negative pressure generation mechanism 31. The negative pressure generation mechanism 31 includes a fluid introduction groove 32 communicated with a sealed fluid side and an annular groove portion 33 having an opening 34 communicated with the fluid introduction groove 32 on a downstream side and a dead end portion 35 surrounded by a sealed-fluid-side land portion R1, a leakage-side land portion R2, and a radial land portion R3. With this configuration, in the negative pressure generation mechanism 31, the upstream-side dead end portion 35 is separated from the sealed fluid side and a leakage side by the radial land portion R3 arranged between the sealed-fluid-side land portion R1 and the leakage-side land portion R2, and the downstream-side opening 34 is communicated with the sealed fluid side. The depth of the groove portion 33 is 1 µm to 50 µm, the fluid introduction groove 32 is 50 µm to 1000 µm, and the fluid introduction groove 32 is formed deeper than the groove portion 33.

A predetermined number (six in the embodiment of FIG. 5) of land portions 36 are arranged inside the negative pressure generation mechanism 31. The land portion 36 is formed in a substantially-L shape including an island-shaped land portion 36a and a bridge portion 36b connecting the island-shaped land portion 36a and the sealed-fluid-side land portion R1. An internal space 36e surrounded by the L-shaped land portion 36 and the sealed-fluid-side land portion R1 is communicated with the groove portion 33 of the negative pressure generation mechanism 31 through an opening 36d opening toward an upstream side of the negative pressure generation mechanism 31. A face at which the island-shaped land portions 36a and the bridge portions 36b of the land portions 36 slide on a partner-side sliding face S (a sliding face S of a rotating-side seal ring 3) is smoothly finished with the same height as those of the sealed-fluid-side land portion R1, the leakage-side land portion R2, and the radial land portion R3.

The guide grooves 39 are provided at a bottom portion of the negative pressure generation mechanism 31. A predetermined number of guide grooves 39 include extremely-thin bar-shaped grooves shallower than the groove portion 33 of the negative pressure generation mechanism 31, and are intervals a arranged at substantially-equal in circumferential direction from the leakage-side land portion R2 toward the sealed fluid side. The guide groove 39 is, as a whole, arranged to extend toward the opening 36d of the land portion 36.

When a partner sliding member (the rotating-side seal ring 3) rotates in a predetermined direction (a counterclockwise direction in FIG. 5), fluid in the groove portion 33 of the negative pressure generation mechanism 31 moves, due to viscosity thereof, to the downstream side to follow a movement direction of the rotating-side seal ring 3, and is discharged to the sealed fluid side through the downstream-side fluid introduction groove 32. Thus, in the negative pressure generation mechanism 31, fluid discharged from the groove portion 33 is greater than fluid supplied into the groove portion 33, and for this reason, the inside of the negative pressure generation mechanism 31 is brought into a negative pressure and cavitation occurs. A cavitation region is a gas phase region, and therefore, friction using gas with a small viscosity is dominant. Thus, sliding torque can be reduced as compared to typical fluid lubrication with liquid.

However, when the cavitation region is formed across a wide area of the sliding face S, the sliding face S is entirely under the negative pressure, and the stationary-side seal ring 5 and the rotating-side seal ring 3 stick and contact each other. For this reason, a fluid lubrication state cannot be maintained. For this reason, the land portions 36 are arranged inside the negative pressure generation mechanism 31 so that a positive pressure can be generated by a wedge effect caused by the land portions 36 to push out a portion between the sliding faces S and bring the portion between sliding faces S into the fluid lubrication state. Note that the number of land portions 36 is not limited to that in the present embodiment as long as the sliding faces S can be pushed out and brought into the fluid lubrication state, and may be more or less than six.

A liquid flow is also normally present inside the cavitation region. Such liquid is heavier than gas, and is gathered to the bottom portion of the negative pressure generation mechanism 31. Thus, the guide grooves 39 are provided at a bottom portion of the groove portion 33 of the negative pressure generation mechanism 31 so that the liquid in the cavitation region can be efficiently gathered to the openings 36d of the land portions 36 arranged inside the negative pressure generation mechanism 31. The liquid gathered to the openings 36d of the land portions 36 generate a high positive pressure by the wedge effect by the land portions 36, and can maintain the fluid lubrication state.

Specifically, in a case where the rotary shaft 10 rotates at high speed, the liquid inside the cavitation region is susceptible to centrifugal force, and tends to be gathered to the outside in a radial direction of the sliding face S. Thus, in a case where the rotating-side seal ring 3 rotates at high speed, the land portion 36 is formed in the substantially-L shape extending from the sealed-fluid-side (outer-diameter-side) land portion R1 so that the liquid inside the cavitation region can be efficiently gathered to the land portions 36 and a high positive pressure can be generated by the wedge effect by the land portions 36.

As described above, the sliding member of the third embodiment provides the following advantageous effects.

1. The negative pressure generation mechanism 31 generates the negative pressure, and the inside of the negative pressure generation mechanism 31 becomes the cavitation region. Thus, friction using gas is dominant in the negative pressure generation mechanism 31. Consequently, the sliding torque can be reduced as compared to typical fluid lubrication with liquid.
2. In a case where the rotating-side seal ring 3 rotates at high speed, liquid inside the cavitation region tends to be gathered to the sealed fluid side due to influence of the centrifugal force. Thus, the land portion 36 is formed in the substantially-L shape extending from the outer-diameter-side land portion R1 so that the liquid in the cavitation region can be efficiently gathered to the land portions 36.
3. The liquid, which has been guided to the land portions 36 by the guide grooves 39, in the cavitation region generates the positive pressure by the wedge effect by the land portions 36 so that the sliding faces S can be pushed out and can be maintained in the fluid lubrication state.
4. The negative pressure generation mechanism 31 becomes the negative pressure region, and therefore, exerts pumping action for sucking fluid into the portion between the sliding faces S from the leakage side by the negative pressure so that leakage can be reduced and sealability can be further improved.
5. The negative pressure generation mechanism 31 is formed across both sides of the average diameter Rm of the sliding face S of the stationary-side seal ring 5, and the substantially-L-shaped land portions 36 extending from the sealed-fluid-side land portion R1 are provided. Thus, the sealed fluid side of the sliding face S serves as a positive pressure region to exert a fluid lubrication function to reduce the sliding torque, and the leakage side of the sliding face S serves as the gas phase region as the cavitation region to further reduce the sliding torque. Moreover, the pumping action is exerted utilizing the negative pressure in the negative pressure generation mechanism 31, and sealability improvement can be accomplished. That is, sliding torque reduction and sealability improvement as conflicting performances can be accomplished by the single negative pressure generation mechanism 31 without the need for separately providing a positive pressure generation mechanism and a negative pressure generation mechanism as in a typical technique, and therefore, the sliding member can be compactified.

Fourth Embodiment

Figure 6:
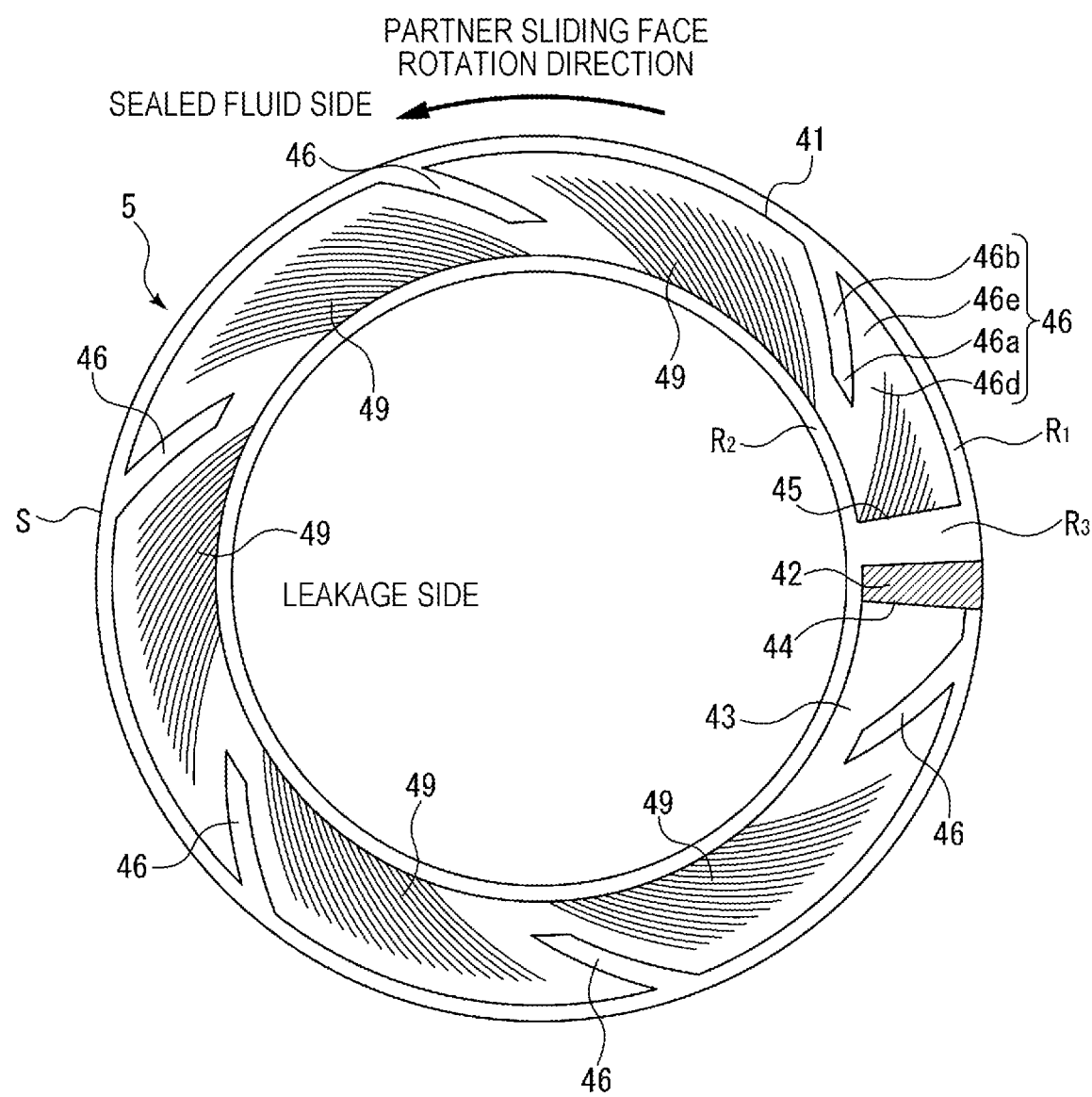
FIG. 6 is a view showing a sliding face of a sliding member of a fourth embodiment as viewed from the W-W arrow of FIG. 1.

A sliding member according to a fourth embodiment of the present invention will be described. FIG. 6 shows a sliding face S of the sliding member according to the fourth embodiment. FIG. 6 is only different from the third embodiment in the shape of a land portion 46, and is the same as the third embodiment in other configurations. Hereinafter, the same reference numerals are used to represent the same members as those of the third embodiment, and overlapping description will be omitted.

As shown in FIG. 6, a sliding face S of a stationary-side seal ring 5 includes a negative pressure generation mechanism 41. The negative pressure generation mechanism 41 includes a fluid introduction groove 42 communicated with a sealed fluid side and an annular groove portion 43 having an opening 44 communicated with the fluid introduction groove 42 on a downstream side and a dead end portion 45 surrounded by a sealed-fluid-side land portion R1, a leakage-side land portion R2, and a radial land portion R3. With this configuration, in the negative pressure generation mechanism 41, the upstream-side dead end portion 45 is separated from the sealed fluid side and a leakage side by the radial land portion R3 arranged between the sealed-fluid-side land portion R1 and the leakage-side land portion R2, and the downstream-side opening 44 is communicated with the sealed fluid side. The depth of the groove portion 43 is 1 μm to 50 μm, the fluid introduction groove 42 is 50 μm to 1000 μm, and the fluid introduction groove 42 is formed deeper than the groove portion 43.

A predetermined number (six in the embodiment of FIG. 6) of land portions 46 are arranged inside the negative pressure generation mechanism 41. The land portion 46 is formed in an arc shape including a pointed island-shaped land portion 46a and a bridge portion 46b connecting the land portion 46a and the sealed-fluid-side land portion R1. The land portion 46 has an internal space 46e surrounded by the sealed-fluid-side land portion R1 and an opening 46d opening toward an upstream side of the negative pressure generation mechanism 41, and is communicated with the groove portion 43 of the negative pressure generation mechanism 41 through the opening 46d. A face at which the pointed island-shaped land portions 46a and the bridge portions 46b of the land portions 46 slide on a partner-side sliding face S (a sliding face S of a rotating-side seal ring 3) is smoothly finished with the same height as those of the sealed-fluid-side land portion R1, the leakage-side land portion R2, and the radial land portion R3 of the negative pressure generation mechanism 41.

Guide grooves 49 are provided at a bottom portion of the negative pressure generation mechanism 41. A predetermined number of guide grooves 49 include extremely-thin bar-shaped grooves shallower than the groove portion 43, and are arranged at substantially-equal intervals in a circumferential direction from the leakage-side land portion R2 toward the sealed fluid side. The guide groove 49 is, as a whole, arranged to extend toward the opening 46d of the land portion 46.

When a partner sliding member (the rotating-side seal ring 3) rotates in a predetermined direction (a counterclockwise direction in FIG. 6), fluid in the groove portion 43 of the negative pressure generation mechanism 41 moves, due to viscosity thereof, to follow a movement direction of the rotating-side seal ring 3, and is discharged to the sealed fluid side through the downstream-side fluid introduction groove 42. Thus, in the negative pressure generation mechanism 41, fluid discharged from the groove portion 43 is greater than fluid supplied into the groove portion 43, and for this reason, the inside of the negative pressure generation mechanism 41 is brought into a negative pressure and cavitation occurs. A cavitation region is a gas phase region, and therefore, friction using gas with a small viscosity is dominant. Thus, sliding torque can be reduced as compared to typical fluid lubrication with liquid.

However, when the cavitation region is formed across a wide area of the sliding face S, the sliding face S is entirely under the negative pressure, and the stationary-side seal ring 5 and the rotating-side seal ring 3 stick and contact each other. For this reason, a fluid lubrication state cannot be maintained. For this reason, the land portions 46 are arranged inside the negative pressure generation mechanism 41 such that a positive pressure is generated at the periphery of the land portions 46 by a wedge effect to push out a portion between the sliding faces S and bring the portion between sliding faces S into the fluid lubrication state. Note that the number of land portions 46 is not limited to that in the present embodiment as long as the portion between the sliding faces S can be pushed out and brought into the fluid lubrication state, and may be more or less than six.

The cavitation region is the gas phase region, but a liquid flow is also normally present inside the cavitation region. Such liquid is heavier than gas, and is gathered to the bottom portion of the negative pressure generation mechanism 41. Thus, the guide grooves 49 are provided at the bottom portion of the negative pressure generation mechanism 41 so that the liquid in the cavitation region can be efficiently gathered to the openings 46d of the land portions 46 arranged inside the negative pressure generation mechanism 41. The liquid gathered to the openings 46d of the land portions 46 generate a high positive pressure by the wedge effect by the land portions 46, and can maintain the fluid lubrication state.

The internal space 46e of the land portion 46 is a flow path narrowed toward the downstream side from the upstream-side opening 46d, and therefore, the liquid, which has been guided to the land portion 46, in the cavitation region can generate a higher positive pressure by a throttle effect by the narrowed flow path and the wedge effect by the land portion 46.

As described above, the sliding member according to the fourth embodiment provides the following advantageous effect in addition to the advantageous effects of the third embodiment:

the land portion 46 is formed as the flow path narrowed toward the downstream side from the upstream-side opening 46d, and therefore, the liquid, which has been guided to the land portion 46, in the cavitation region can generate a much higher positive pressure than those of the second and third embodiments by a pressure increase effect by the throttle effect by the narrowed flow path and the wedge effect by the land portion 46.

Fifth Embodiment

Figure 7:
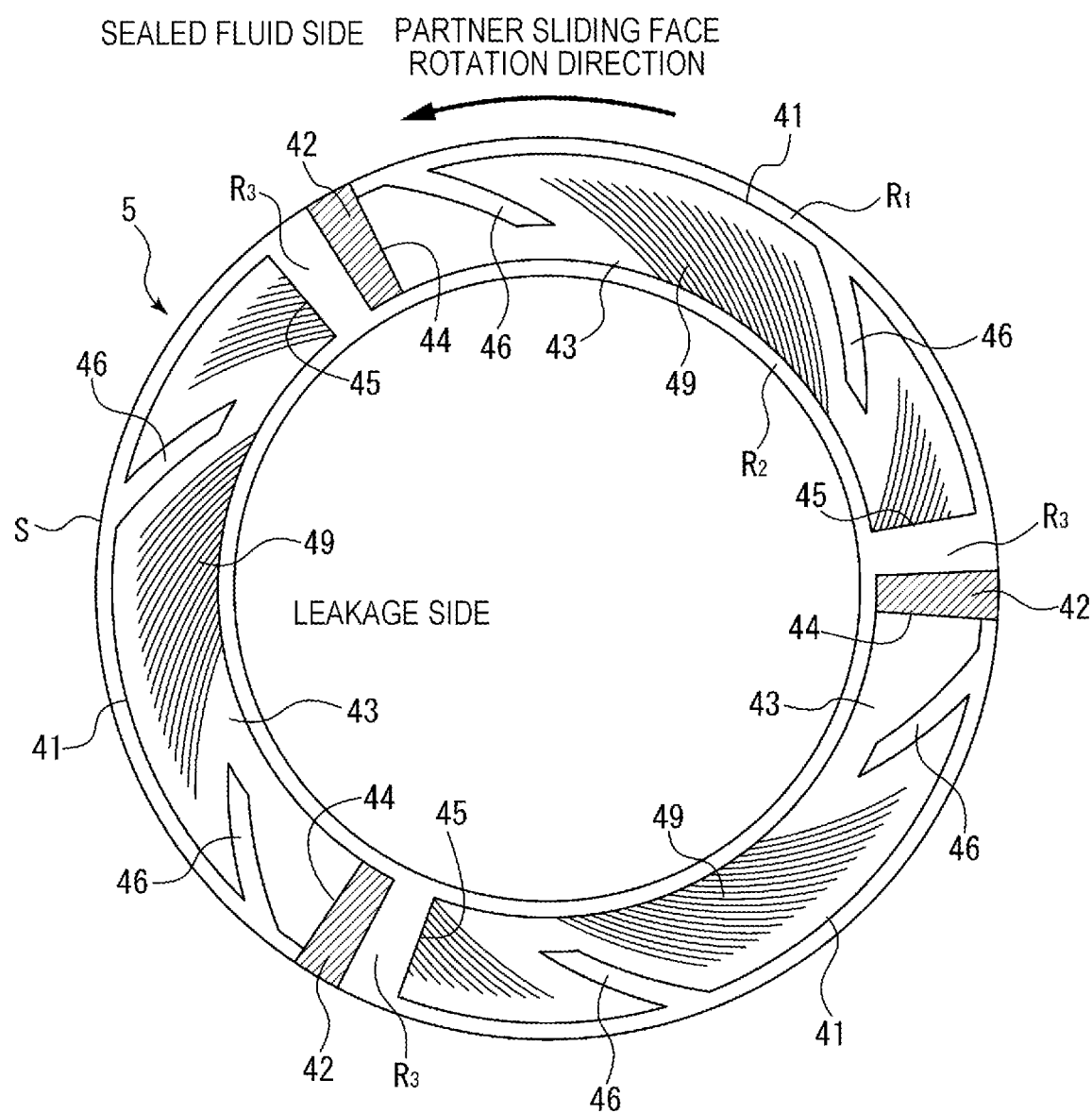
FIG. 7 is a view showing a sliding face of a sliding member of a fifth embodiment as viewed from the W-W arrow of FIG. 1.

A sliding member according to a fifth embodiment of the present invention will be described. FIG. 7 shows a sliding face S of the sliding member according to the fifth embodiment. FIG. 7 is different from the fourth embodiment in that multiple negative pressure generation mechanisms 41 of the fourth embodiment are provided at the sliding face S. Other configurations are the same as those of the fourth embodiment. Hereinafter, the same reference numerals are used to represent the same members as those of the fourth embodiment, and overlapping description will be omitted.

As shown in FIG. 7, a sliding face S of a stationary-side seal ring 5 is configured such that a predetermined number (three in FIG. 7) of negative pressure generation mechanisms 41 are arranged in a circumferential direction with a radial land portion R3 being interposed between adjacent ones of the negative pressure generation mechanisms 41, the negative pressure generation mechanism 41 including a predetermined number (two in the embodiment of FIG. 7) of land portions 46 and a guide groove 49 in a groove portion 43. Note that the number of negative pressure generation mechanisms 41 arranged in the circumferential direction with the radial land portion R3 being interposed between adjacent ones of the negative pressure generation mechanisms 41 is not limited to that in the embodiment, and may be two, four, five, or six or more.

In the fifth embodiment, three negative pressure generation mechanisms 41 each configured such that the multiple land portions 46 are arranged are provided in the circumferential direction with the radial land portion R3 being interposed between adjacent ones of the negative pressure generation mechanisms 41, and therefore, fluid is supplied to the sliding face S from multiple locations by the fluid introduction grooves 42. Thus, even when a fluid lubrication state is not sufficient in a low-speed rotation state such as start-up timing, the fluid supplied from the fluid introduction grooves 42 can contribute to lubrication of the sliding face S.

As described above, the sliding member according to the fifth embodiment provides the following advantages effect in addition to the advantageous effects of the fourth embodiment:

the multiple fluid introduction grooves 42 are provided such that the fluid is supplied from the fluid introduction grooves 42 to the sliding face S at multiple locations in the circumferential direction, and therefore, even when the fluid lubrication state is not sufficient in the low-speed rotation state such as the start-up timing, the fluid equally supplied from the multiple fluid introduction grooves 42 in the circumferential direction can contribute to lubrication of the sliding face S.

Sixth Embodiment

Figure 8:
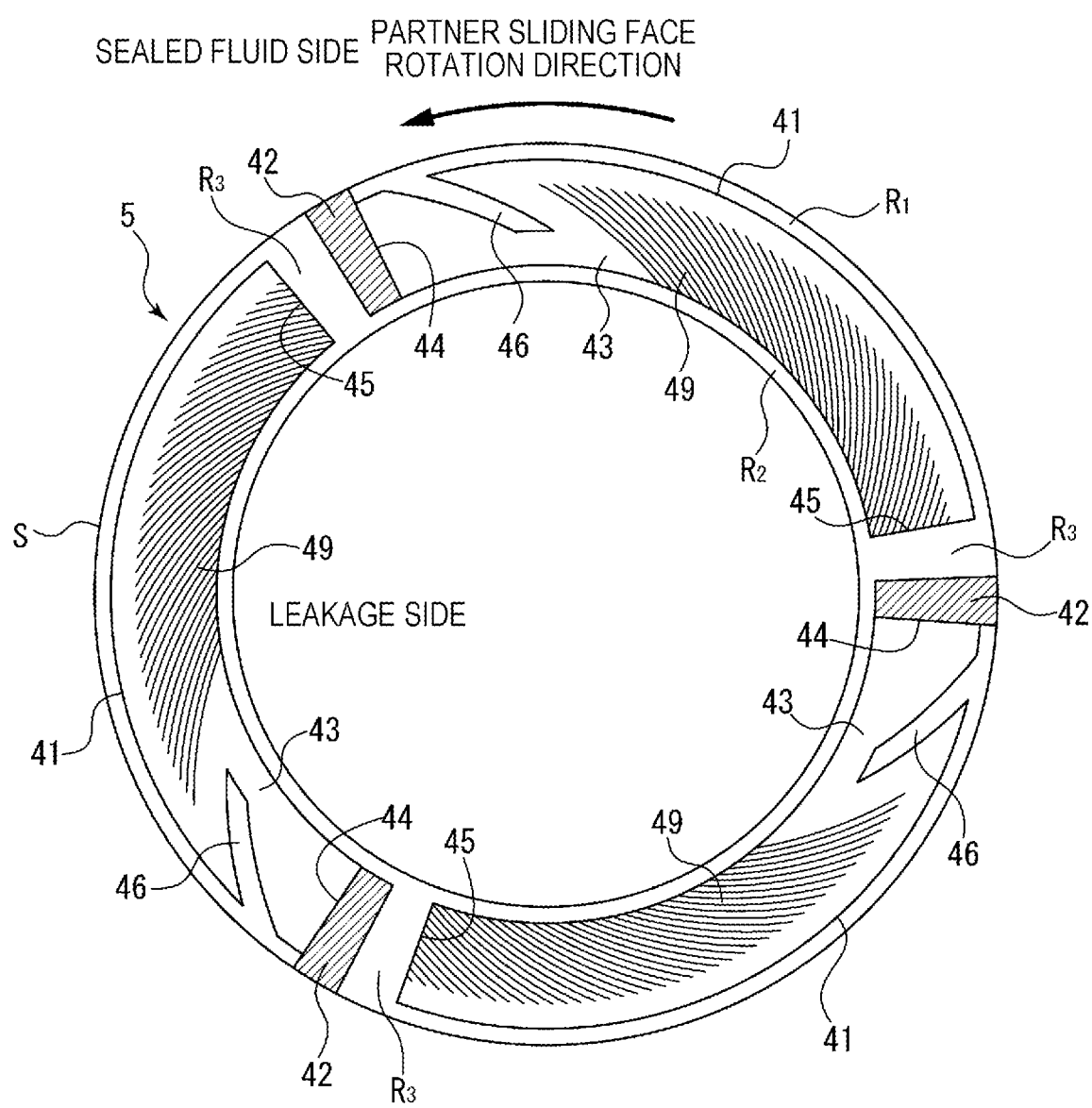
FIG. 8 is a view showing a sliding face of a sliding member of a sixth embodiment as viewed from the W-W arrow of FIG. 1.

A sliding member according to a sixth embodiment of the present invention will be described. FIG. 8 shows a sliding face S of the sliding member according to the sixth embodiment. FIG. 8 is different from the fifth embodiment in the number of land portions 46, but other configurations are the same as those of the fifth embodiment. Hereinafter, the same reference numerals are used to represent the same members as those of the fifth embodiment, and overlapping description will be omitted.

As shown in FIG. 8, a sliding face S of a stationary-side seal ring 5 is configured such that a predetermined number (three in FIG. 8) of negative pressure generation mechanisms 41 are arranged in a circumferential direction with a radial land portion R3 being interposed between adjacent ones of the negative pressure generation mechanisms 41, the negative pressure generation mechanism 41 including a single land portion 46 and a guide groove 49 in a groove portion 43. Note that the number of negative pressure generation mechanisms 41 arranged in the circumferential direction with the radial land portion R3 being interposed between adjacent ones of the negative pressure generation mechanisms 41 is not limited to that in the embodiment, and may be two, four, five, or six or more.

A flow in the negative pressure generation mechanism 41 can be concentrated to the single land portion 46 provided on a downstream side, and therefore, a higher positive pressure than that in the case of providing the multiple land portions 46 in the single negative pressure generation mechanism 41 can be generated. This is suitable for a case for generating a high pressure on the sliding face S by a small sliding member.

As described above, the sliding member according to the sixth embodiment provides the following advantages effect in addition to the advantageous effects of the fifth embodiment:

each of the multiple negative pressure generation mechanisms 41 is provided with the single land portion 46 on the downstream side so that a fluid flow in a cavitation region can be concentrated to the single land portion 46, and therefore, a high positive pressure can be generated by a pressure increase effect by a narrowed flow path and a wedge effect by the land portion 46.

Seventh Embodiment

Figure 9:
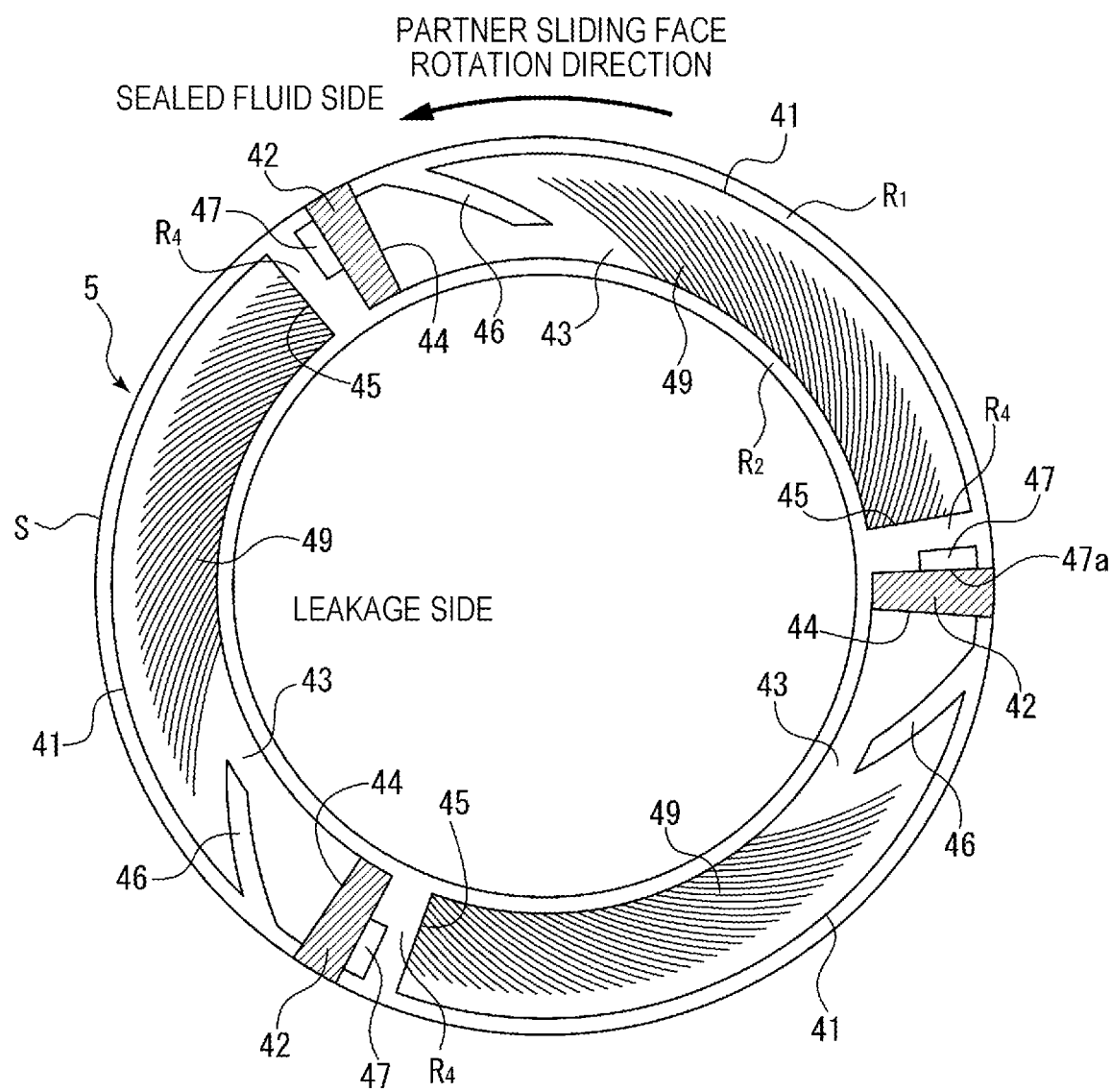
FIG. 9 is a view showing a sliding face of a sliding member of a seventh embodiment as viewed from the W-W arrow of FIG. 1.

A sliding member according to a seventh embodiment of the present invention will be described. FIG. 9 shows a sliding face S of the sliding member according to the seventh embodiment. FIG. 9 is different from the sixth embodiment in that a positive pressure generation mechanism 47 is provided in a radial land portion R4 of a negative pressure generation mechanism 41, but other configurations are the same as those of the sixth embodiment. Hereinafter, the same reference numerals are used to represent the same members as those of the sixth embodiment, and overlapping description will be omitted.

As shown in FIG. 9, a sliding face S of a stationary-side seal ring 5 is configured such that a predetermined number (three in FIG. 9) of negative pressure generation mechanisms 41 are arranged in a circumferential direction with the radial land portion R4 being interposed between adjacent ones of the negative pressure generation mechanisms 41, the negative pressure generation mechanism 41 including a predetermined number (one in an example of FIG. 9) of land portions 46 and a guide groove 49 in a groove portion 43. The guide grooves 49 covering the substantially entire area of the negative pressure generation mechanism 41 is arranged to extend toward the single land portion 46 provided on a downstreammost side. Note that the number of negative pressure generation mechanisms 41 arranged in the circumferential direction with the radial land portion R4 being interposed between adjacent ones of the negative pressure generation mechanisms 41 is not limited to that in the embodiment, and may be two, four, five, or six or more. Moreover, the number of land portions 46 provided at each of the negative pressure generation mechanisms 41 is not limited to that in the present embodiment as long as a portion between the sliding faces S can be pushed out and brought into a fluid lubrication state, and may be two or three or more.

As shown in FIG. 9, the positive pressure generation mechanism 47 is provided in the radial land portion R4 between a sealed-fluid-side land portion R1 and a leakage-side land portion R2. The positive pressure generation mechanism 47 is a bottomed groove portion in a rectangular shape as viewed in an axial direction, and has an opening 47a communicated with a fluid introduction groove 42. A portion other than the opening 47a is surrounded by the radial land portion R4.

When a partner sliding member (a rotating-side seal ring 3) rotates in a predetermined direction (a counterclockwise direction in FIG. 9), fluid flows into the positive pressure generation mechanism 47 from the fluid introduction groove 42 through the opening 47a. The fluid having flowed into the positive pressure generation mechanism 47 is held back in the positive pressure generation mechanism 47, and a positive pressure is generated by a wedge effect. With this positive pressure, even when a fluid lubrication state is not sufficient in a low-speed rotation state such as start-up timing, liquid film formation at the start-up timing can be supported.

As described above, the sliding member according to the seventh embodiment provides the following advantageous effect in addition to the advantageous effects of the sixth embodiment:
the positive pressure generation mechanism 47 is provided in the radial land portion R4 of the negative pressure generation mechanism 41, and therefore, even when the fluid lubrication state is not sufficient in the low-speed rotation state such as the start-up timing, liquid film formation at the start-up timing can be supported by the positive pressure generated by the positive pressure generation mechanism 47.

Note that the positive pressure generation mechanism 47 is in the rectangular shape as viewed in the axial direction, but is not limited to such a shape. The positive pressure generation mechanism 47 may be a triangular shape, a polygonal shape of a pentagonal shape etc., a semicircular shape, or a semi-elliptical shape, for example.

The embodiments of the present invention have been described above with reference to the drawings, but specific configurations are not limited to these embodiments. The present invention also includes changes and additions made without departing from the gist of the present invention.

In the above-described embodiments, the outer peripheral side has been described as the sealed fluid side, and the inner peripheral side has been described as the leakage side. However, the present invention is not limited to above, and is also applicable to a case where the inner peripheral side is the sealed fluid side and the outer peripheral side is the leakage side.

The negative pressure generation mechanism, the land portion, and the guide groove are provided at the sliding face S of the stationary-side seal ring 5, but may be provided at the sliding face S of the rotating-side seal ring 3.

REFERENCE SIGNS LIST

1 mechanical seal
2 sleeve
3 rotating-side seal ring
4 housing
5 stationary-side seal ring
6 coiled wave spring
7 bellows
8 packing
9 casing
10 rotary shaft
21 negative pressure generation mechanism
22 fluid introduction groove
23 groove portion
24 opening
25 dead end portion
26 land portion
26*a* wall portion
26*b* wall portion
26*c* wall portion
26*d* opening
26*e* internal space
29 guide groove
29*a* sealed-fluid-side guide groove
29*b* leakage-side guide groove
31 negative pressure generation mechanism
32 fluid introduction groove
33 groove portion
34 opening
35 dead end portion
36 land portion
36*b* bridge portion
39 guide groove
41 negative pressure generation mechanism
42 fluid introduction groove
43 groove portion
44 opening
45 dead end portion
46 land portion
46*a* land portion
46*b* bridge portion
46*d* opening
46*e* internal space
47 positive pressure generation mechanism
47*a* opening
49 guide groove
R1 sealed-fluid-side land portion
R2 leakage-side land portion
R3 radial land portion
R4 radial land portion
Rm average diameter
S sliding face

The invention claimed is:

1. A pair of sliding members sliding relative to each other at sliding faces, wherein at least one of the sliding faces includes a negative pressure generation mechanism and a land portion arranged in the negative pressure generation mechanism, wherein
the negative pressure generation mechanism includes an opening end portion which is open to a sealed fluid side, a closed end portion which is closed with respect to the sealed fluid side and a leakage side, and a negative pressure generation groove portion which is disposed between the opening end portion and the closed end portion to be separated from the sealed fluid side and the leakage side by an outer diameter side land portion and an inner diameter side land portion,
the land portion arranged in the negative pressure generation mechanism is an island-shaped land portion surrounded by the negative pressure generation groove portion and separated from the outer dimeter side land portion and the inner diameter side land portion.

2. The sliding members according to claim 1, wherein
the negative pressure generation mechanism includes a guide groove formed in a bottom of the negative pressure generation groove portion and extending from the leakage side toward the island-shaped land portion arranged in the negative pressure generation groove portion.

3. The sliding members according to claim 1, wherein
the negative pressure generation mechanism includes a guide groove formed in a bottom of the negative pressure generation groove portion and extending from each of the leakage side and the sealed fluid side toward the island-shaped land portion arranged in the negative pressure generation mechanism.

4. The sliding members according to claim 1, wherein
the negative pressure generation mechanism is arranged across an average diameter of the at least one of the sliding faces.

5. The sliding members according to claim 1, wherein
the negative pressure generation mechanism further includes a fluid introduction groove portion having the opening end portion and extending in a radial direction, and
the negative pressure generation groove portion is a circumferentially extending groove portion which extends from the fluid introduction groove portion to the closed end portion in the circumferential direction.

6. The sliding members according to claim 5, wherein
the one of the sliding faces further includes a positive pressure generation groove portion communicated with the fluid introduction groove portion at one end and circumferentially extending toward a downstream side of relative rotation of the sliding faces.

7. The sliding members according to claim 1, wherein
at least another negative pressure generation mechanism is provided in at the at least one of the sliding faces.

8. The sliding members according to claim 1, wherein
at least another island-shaped land portion is provided in the negative pressure generation mechanism.

9. The sliding members according to claim 2, wherein
the negative pressure generation mechanism includes a guide groove formed in a bottom of the negative pressure generation groove portion and extending from each of the leakage side and the sealed fluid side toward the island-shaped land portion arranged in the negative pressure generation mechanism.

10. The sliding members according to claim 2, wherein
the negative pressure generation mechanism is arranged across an average diameter of the at least one of the sliding faces.

11. The sliding members according to claim 2, wherein
the negative pressure generation mechanism further includes a fluid introduction groove portion having the opening end portion and extending in a radial direction, and
the negative pressure generation groove portion is a circumferentially extending groove portion which extends from the fluid introduction groove portion to the closed end portion in the circumferential direction.

12. The sliding members according to claim 11, wherein
the one of the sliding faces further includes a positive pressure generation groove portion communicated with the fluid introduction groove portion at one end and circumferentially extending toward a downstream side of relative rotation of the sliding faces.

13. The sliding members according to claim 2, wherein
at least another negative pressure generation mechanism is provided in at the at least one of the sliding faces.

14. The sliding members according to claim 2, wherein
at least another island-shaped land portion is provided in the negative pressure generation mechanism.

15. The sliding members according to claim 3, wherein
the negative pressure generation mechanism is arranged across an average diameter of the at least one of the sliding faces.

16. The sliding members according to claim 3, wherein
the negative pressure generation mechanism further includes a fluid introduction groove portion having the opening end portion and extending in a radial direction, and
the negative pressure generation groove portion is a circumferentially extending groove portion which extends from the fluid introduction groove portion to the closed end portion in the circumferential direction.

17. The sliding members according to claim 16, wherein
the one of the sliding faces further includes a positive pressure generation groove portion communicated with the fluid introduction groove portion at one end and circumferentially extending toward a downstream side of relative rotation of the sliding faces.

* * * * *